(12) United States Patent
Baeuerle et al.

(10) Patent No.: US 6,453,854 B1
(45) Date of Patent: Sep. 24, 2002

(54) METHOD AND DEVICE FOR MONITORING A VARIABLE CYLINDER COMPRESSION RATIO

(75) Inventors: Michael Baeuerle, Markgroeningen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/714,585

(22) Filed: Nov. 16, 2000

(30) Foreign Application Priority Data

Nov. 17, 1999 (DE) .......................... 199 55 250

(51) Int. Cl.$^7$ ............................................. F02D 15/00
(52) U.S. Cl. ..................................................... 123/78 E
(58) Field of Search ............................. 123/48 B, 48 R, 123/48 D, 48 A, 78 R, 78 A, 78 AA, 78 B, 78 BA, 78 C, 78 D, 78 E, 78 F, 197.4, 197.3; 701/114; 73/117.3

(56) References Cited

U.S. PATENT DOCUMENTS

| | | |
|---|---|---|
| 4,495,920 A | 1/1985 | Matsumura et al. |
| 4,834,031 A * | 5/1989 | Katoh et al. ............... 123/48 R |
| 5,121,729 A | 6/1992 | Hashimoto et al. |
| 5,531,100 A * | 7/1996 | Mezger et al. ................. 73/47 |

FOREIGN PATENT DOCUMENTS

| | | |
|---|---|---|
| DE | 25 07 057 | 9/1976 |
| DE | 37 14 762 | 11/1988 |
| DE | 38 33 323 | 4/1989 |
| DE | 38 25 369 | 5/1989 |
| DE | 40 28 594 | 3/1992 |
| DE | 197 03 948 | 6/1998 |
| DE | 197 36 131 | 10/1998 |
| DE | 198 44 200 | 6/1999 |
| JP | 60-230548 | 11/1985 |
| JP | 62-142860 | 6/1987 |
| JP | 63-159642 | 7/1988 |
| JP | 63-186925 | 8/1988 |

* cited by examiner

Primary Examiner—Marguerite McMahon
Assistant Examiner—Hyder Ali
(74) Attorney, Agent, or Firm—Kenyon & Kenyon

(57) ABSTRACT

The functionality of the device for variably adjusting the cylinder compression ratio can be monitored easily, and without a special sensor, by ascertaining the running irregularity of the internal combustion engine both before and after controlling the device for changing the cylinder compression ratio; and by comparing the two running-irregularity values to each other, in order to determine if the runningirregularity has changed. A change in the running irregularity is an indication that the device for variably adjusting the cylinder compression ratio is functioning correctly.

6 Claims, 1 Drawing Sheet

METHOD AND DEVICE FOR MONITORING A VARIABLE CYLINDER COMPRESSION RATIO

FIELD OF THE INVENTION

The present invention relates to a method and a device for monitoring the functionality of a device for variably adjusting the cylinder compression ratio in a reciprocating internal combustion engine.

BACKGROUND INFORMATION

It is desirable to adjust the cylinder compression ratios to the operating states of a reciprocating internal combustion engine, especially to the load under which the engine is running. For if, e.g., the compression can be increased at low load and decreased at full load (throttle), considerable reductions in fuel consumption can be achieved. By variably adjusting the compression ratio, as is known, for example, from German Patent Application No. DE 198 44 200 or German Patent No. DE 197 03 948, a low compression ratio (e.g., e=8) is advantageously set at full throttle to prevent knocking that is damaging to the engine. In the case of a highly loaded engine, this produces a high specific full-throttle torque. At part throttle, the compression ratio is increased (e.g., e=15). This allows considerable improvements in efficiency in comparison with naturally aspirated engines and conventional compression engines. Devices for variably adjusting the cylinder compression ratio are known from the two mentioned documents, DE 197 03 948 and DE 198 44 200, where the effective length of the connecting rods, which join the pistons in the cylinders to the crankshaft, can be varied. If a defect occurs on a device, with which an internal combustion engine is equipped, and whose function is to variably adjust the cylinder compression ratio, then this would disadvantageously lead to an increase in fuel consumption. In order to avoid this disadvantage, the present invention is based on the object of providing a method and a device, by which the functionality of the device for variably adjusting the cylinder compression ratio is monitored, and by which a malfunction or a defect of this device can be detected as quickly as possible.

SUMMARY OF THE INVENTION

The above-mentioned object is achieved in that an engine operating parameter, which reacts to a change in the cylinder compression ratio, is ascertained both before and after controlling the device for changing the cylinder compression ratio; and in that both values of the engine operating parameter are compared to each other, in order to determine if the engine operating parameter has changed; a change of the engine operating parameter being an indication that the device for variably adjusting the cylinder compression ratio is functioning correctly. The present invention allows a device for variably adjusting the cylinder compression ratio to be monitored for functionality, without requiring additional sensors for measuring the cylinder compression ratio.

Therefore, during the deceleration of the internal combustion engine, it is useful to control the device for changing the cylinder compression ratio and to ascertain the engine operating parameter before and after controlling this device, in order to carry out the functionality monitoring (implement the watchdog functions).

Furthermore, it is useful to control the device for: changing the cylinder compression ratio in a manner allowing the compression ratio of each cylinder to be adjusted individually, and it is useful to ascertain the engine operating parameter before and after controlling each individual cylinder, in order to carry out the functionality monitoring for each cylinder.

The running irregularity, combustion-chamber pressure, intake-manifold pressure, or engine torque is suitable as the engine operating parameter for monitoring the variable compression ratio.

DETAILED DESCRIPTION

Figure 1:
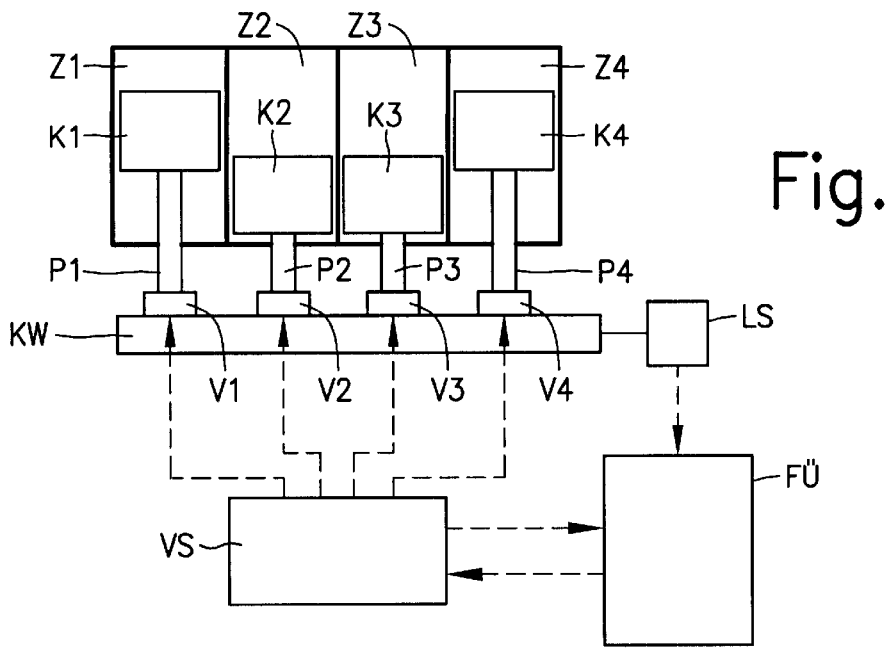
FIG. 1 shows a schematic representation of an internal combustion engine having a device for variably adjusting the cylinder compression ratio.

An internal combustion engine having four cylinders Z1, Z2, Z3, and Z4 and pistons K1, K2, K3, and K4 moving therein is represented schematically in FIG. 1. However, the present invention described below is not restricted to an internal combustion engine having four cylinders. Each of pistons K1, K2, K3, and K4 is joined to a crankshaft KW by a connecting rod P1, P2, P3, and P4.

The compression ratio in individual cylinders Z1, Z2, Z3, and Z4 of the internal combustion engine can be varied. In particular, the compression ratio in the individual cylinders can be adjusted to the load of the internal combustion engine. As is known from the documents DE 197 03 948 and DE 198 44 200 cited above, the compression ratio in the cylinders is increased at low load and decreased at full load. The main effect of this is a reduction of the fuel consumption. As is described in detail in the mentioned publications, the compression in cylinders Z1, Z2, Z3, and Z4 can be affected by adjusting the effective length of connecting rod P1, P2, P3, and P4. To this end, controllable devices V1, V2, V3, and V4 are provided for each connecting rod P1, P2, P3, and P4, in the area of crankshaft KW, the controllable devices lengthening or shortening connecting rods P1, P2, P3, P4, and consequently shifting the top and/or bottom dead centers of pistons K1, K2, K3, K4. The result is a change in the compression ratios in cylinders Z1, Z2, Z3, Z4. Since devices V1, V2, V3, and V4 for varying the length of connecting rods P1, P2, P3, and P4 are described in detail in the documents DE 197 03 948 and DE 198 44 200, they are not discussed here any further. Devices V1, V2, V3, and V4, which can also be designated as final compression control elements, are controlled by a control circuit VS. And as mentioned earlier, this control circuit VS controls final compression control elements V1, V2, V3, V4 as a function of the instantaneous load of the internal combustion engine.

Figure 2:
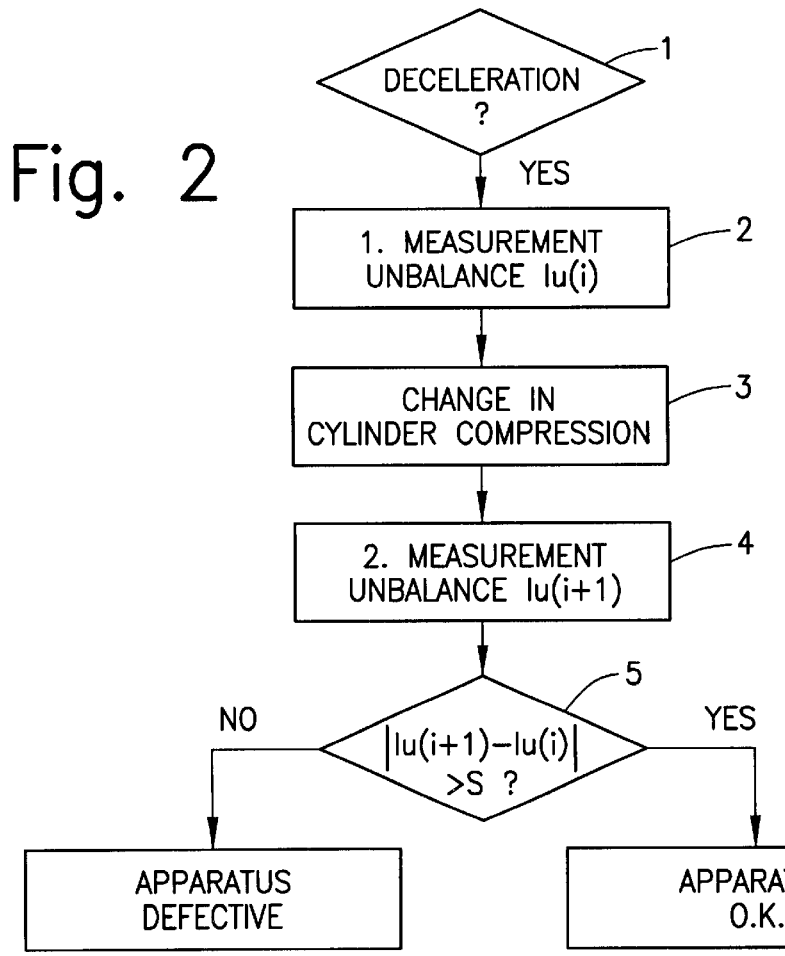
FIG. 2 shows a flow diagram for a method for monitoring the device for variably adjusting the cylinder compression ratio.

The device for variably adjusting the cylinder compression ratio should be monitored for its functionality. To this end, a functional monitoring circuit (watchdog circuit) FÜ is provided, in which a monitoring procedure shown below in a flow chart in FIG. 2 is implemented.

In a first method step, it is determined if the internal combustion engine is decelerating at that point. If this is the case, a first measurement of running irregularity lu(i) is taken in a second method step. A running-irregularity sensor is provided for this purpose. For example, the running irregularity is determined by sensor LS in a known manner (see, for example, German Patent No. DE OS 25 07 057, or U.S. Pat. No. 4,495,920), in that the rotational speed of the internal combustion engine is measured at each individual cylinder and compared to the average speed of all the cylinders. The deviation between the two measured quantities then represents the running irregularity caused by the specific cylinder.

Therefore, the functionality monitoring is beneficial during deceleration, because the fuel injection is inactive as a result of the deceleration fuel cutoff. The change in compression effected for the functionality monitoring does not interfere with any combustion process; i.e., there are no undesirable effects on the vehicle performance or the engine knock. As an alternative to deceleration, the functionality monitoring (watchdog functions) can also be used in stationary operating states, such as idling.

In the following method step 3, after measuring the first running irregularity lu(i), the compression is changed in the cylinder in which the running irregularity was previously detected. In the next method step 4, the running irregularity lu(i+1) of the cylinder in question is measured a second time.

In method step 5, the deviation is determined between the first measurement lu(i) and the second measurement lu(i+1) of the running irregularity. Preferably, the difference between the two measured values lu(i+1) and lu(i) is determined. If the magnitude of this deviation exceeds a predefined threshold S, which is dependent on the operating point (e.g. engine temperature, engine speed), it can be assumed that the device for variably adjusting the cylinder compression ratio is functioning correctly. For when the compression in one cylinder is changed, this must have an influence on the running irregularity of the cylinder in question. If the running irregularity measured after changing the cylinder compression ratio has now changed in comparison with the running irregularity measured prior to changing the cylinder compression ratio, this is certainly an indication that the change in running irregularity can be attributed to the change in the cylinder compression ratio. In this respect, the device for variably adjusting the cylinder compression ratio must therefore have functioned correctly. In the other case, when the registered deviation between the two measured values lu(i) and lu(i+1) does not exceed threshold value S, it must certainly be assumed that the device has a defect, since it has not produced a change in the cylinder compression ratio, in spite of the triggering from control circuit VS.

In addition, the magnitude of the compression change can be deduced from the magnitude of the running-irregularity change. For a large change in compression ratio results in a large change in the running irregularity. Therefore, it is possible to quantitatively diagnose the change in compression ratio.

Instead of monitoring the compression change as a function of the running irregularity, other engine operating parameters that react to a compression change can also be considered. Such engine operating parameters can include, for example, the quantities detected by a combustion-chamber pressure sensor, a torque sensor, or an intake-manifold pressure sensor.

A change in the engine torque or the drag torque produced by the change in compression ratio can be compensated for by controlling the throttle valve.

What is claimed is:

1. A method for monitoring a functionality of a device for variably adjusting a cylinder compression ratio in a reciprocating internal combustion engine, comprising the steps of:

both before and after controlling the device for variably adjusting the cylinder compression ratio, ascertaining a value of an engine operating parameter that reacts to a change in the cylinder compression ratio; and comparing the two values of the engine operating parameter to each other to determine if the engine operating parameter has changed, a change in the engine operating parameter being an indication that the device for variably adjusting the cylinder compression ratio is functioning correctly.

2. The method according to claim 1, further comprising the steps of, while the engine is one of decelerating and idling, controlling the device for variably adjusting the cylinder compression ratio, and ascertaining the engine operating parameter before and after controlling the device for variably adjusting the cylinder compression ratio, in order to carry out a functionality monitoring.

3. The method according to claim 1, wherein the device for variably adjusting the cylinder compression ratio is controlled in a manner allowing a compression ratio of each cylinder to be adjusted individually, and the value of the engine operating parameter is ascertained before and after controlling each cylinder, in order to carry out a functionality monitoring for each cylinder.

4. The method according to claim 1, wherein a running irregularity is used as an engine operating parameter for a functionality monitoring.

5. The method according to claim 1, wherein at least one of a combustion-chamber pressure, an intake-manifold pressure and an engine torque is used as an engine operating parameter for a functionality monitoring.

6. A set-up for monitoring a functionality of a device for variably adjusting a cylinder compression ratio in a reciprocating internal combustion engine, comprising:

means for measuring, both before and after controlling the device for variably adjusting the cylinder compression ratio, a value of an engine operating parameter that reacts to a change in the cylinder compression ratio, and for comparing the two values of the engine operating parameter to each other to determine if the engine operating parameter has changed, a change in the engine operating parameter being an indication that the device for variably adjusting the cylinder compression ratio is functioning correctly.

* * * * *